(12) United States Patent
Bluzer et al.

(10) Patent No.: US 7,439,508 B2
(45) Date of Patent: Oct. 21, 2008

(54) ULTRA-SENSITIVE SILICON SENSOR, LONG-WAVE INFRARED MICROANTENNA

(75) Inventors: Nathan Bluzer, Rockville, MD (US);
Glenn Boreman, Orlando, FL (US);
Brian Lail, W. Melbourne, FL (US);
Peter Martin Krenz, Orlando, FL (US)

(73) Assignee: Northrop Grumman Systems Corporation, Los Angeles, CA (US)

( * ) Notice: Subject to any disclaimer, the term of this patent is extended or adjusted under 35 U.S.C. 154(b) by 0 days.

(21) Appl. No.: 11/521,544

(22) Filed: Sep. 15, 2006

(65) Prior Publication Data

US 2008/0224045 A1 Sep. 18, 2008

(51) Int. Cl.
*G01J 5/20* (2006.01)

(52) U.S. Cl. .................................... 250/338.4

(58) Field of Classification Search .............. 250/338.4
See application file for complete search history.

(56) References Cited

U.S. PATENT DOCUMENTS

| 6,329,655 | B1 * | 12/2001 | Jack et al. ............. 250/338.1 |
| 7,253,412 | B2 * | 8/2007 | Bluzer ................. 250/338.1 |
| 2006/0262023 | A1 * | 11/2006 | Engargiola et al. ....... 343/792.5 |

* cited by examiner

*Primary Examiner*—David P. Porta
*Assistant Examiner*—Carolyn Igyarto
(74) *Attorney, Agent, or Firm*—Andrews Kurth LLP

(57) ABSTRACT

Hybrid microantennas and improved sensor structures incorporating hybrid microantenna embodiments are described herein. A hybrid long-wave infrared (LWIR) microantenna includes four inner pie-shaped arms in which the four inner pie-shaped arms are in a double bow-tie configuration and a plurality of outer pie-shaped arms in which a subset of the outer pie-shaped arms is connected to the four inner pie-shaped arms and the pie-shaped arms are sensitive to electric fields and absorb radiation.

19 Claims, 11 Drawing Sheets

ULTRA-SENSITIVE SILICON SENSOR, LONG-WAVE INFRARED MICROANTENNA

BACKGROUND

Certain sensors utilize bolometers. Bolometers detect changes in a scene's actual or radiometric temperature. The ultimate sensitivity of a bolometer is limited by thermal loading. A bolometer's sensitivity is characteristically given in terms of temperature: noise equivalent delta temperature (NEDT). Neglecting readout circuit's noise, a conventional bolometer's equivalent thermal circuit is shown in FIG. 1. The bolometer's sensing element operates at temperature $T_D$ and receives radiation from the scene, at temperature $T_S$, through space/optics that are represented by conductance $G_R$. The bolometer is loaded by two thermal conductances: $G_D$, representing radiative loading through a $4\pi$ solid angle; and by $G_2$, representing thermal loading from legs by which the sensing element is suspended (see FIG. 2). The sensing element's heat capacity is $C_D$.

Bolometers operate as thermal equilibrium devices and using heat flow balance equations, a relationship relating small changes in scene temperature ($\delta T_S$) to changes induced in the bolometer's temperature ($\delta T_D$) is given by Equation (1) below. Thermal loading by $G_D$ and $G_2$ produce attenuations that result in a much smaller temperature change in the bolometer's in response to a change in scene temperature: ($\delta T_D$)<<($\delta T_S$). This attenuation is large for long-wave infrared (LWIR) (about $10^{-2}$) and much larger at 95 GHz (about $10^{-4}$). Attenuation by thermal loading leads to two deleterious effects: (1) direct reduction in sensitivity, neglecting readout circuits noise, and (2) further sensitivity degradations because with smaller signals, readout circuits noise becomes more prominent. Thermal loading directly reduces NEDT because thermodynamic temperature fluctuations $[T_S(k/C_D)^{1/2}]$ are not attenuated while the signal is attenuated by $G_R/(G_D+G_2)$: hence NEDT is degraded by $[(G_D+G_2)/G_R]^{1/2}$. Additionally, noise from the readout circuits further degrades the bolometer's NEDT.

$$\delta T_D = \frac{G_R}{G_D + G_2} \frac{1}{\left[1 + j\omega\left(\frac{C_D}{G_D + G_2}\right)\right]} \delta T_S \quad (1)$$

$$NEDT = \left[\frac{G_D + G_2}{G_R}\right]^{1/2} \sqrt{\frac{kT_S^2}{C_D}}$$

With reference now to FIG. 2, shown is a conventional bolometer 10. As shown, conventional bolometers 10 are suspended by two legs 12. A square sensing element 14 (about 30 μm for LWIR) is suspended by the legs 12 which also form bridges between the bolometer 10 and a heat bath (not shown). Each leg 12 incorporates an insulator for mechanical support and a thin conductor for electrical readout of the sensing element 14. Consequently, these legs 12 provide mechanical support, thermal isolation and electrical access for readout. For maximum thermal isolation, each leg 12 is made long with a small cross section. Additionally, each leg 12 is made from materials with the lowest thermal conductivity conductors and insulators. Characteristically, insulators have a much smaller thermal conductivity than conductors. Consequently, the insulators are made about 1 μm thick and used for mechanical support, while the conducting lines are made as thin as possible, about 30 nm.

The thermal conductivity of silicon dioxide at 300K [$\kappa_{SO}$=1 Watt/M-K] is at least ten times smaller than the thermal conductivity of a conductor used. Nichrome is a conductor with a poor thermal conductivity, equal to $\kappa_N$=12 Watts/M-K at 300K. Stainless Steel is another example of a poor thermal conductivity conductor, with $\kappa_{SS}$=30 Watts/M-K. For LWIR, with small 30 μm pixels, the thermal conductivity for each leg utilizing silicon dioxide and with minimum geometry is about $G_2$=50 nW/K. This thermal conductivity is much larger than radiative conductivities $G_D$=7.7 nW/K, and $G_R$=0.96 nW/K, resulting in the large degradations in sensitivity. At 95 GHz, the pixel size is larger (about 1 mm) hence with longer bridge legs the thermal conductance of $G_2$ can be made significantly smaller. However, mechanical support requirements limit how much longer these bridge legs 12 can be made. More importantly, the value of $G_R \approx 5 \times 10^{-12}$ is much smaller than at LWIR resulting in even more signal attenuation. Clearly a different technique is needed to circumvent the thermal loading problem, particularly at 95 GHz, and beyond into the so called Terahertz imaging gap.

A ultra sensitive silicon sensor (USSS) described below provides an improved technique to circumvent the thermal loading problem. However, using conventional microantennas in the USSS approach presents its own problems. First, sensitivity at LWIR only in the center portion of conventional microantennas is grossly insufficient to recover pixel fill factor efficiency. Second, a narrow FOV provided by conventional microantennas further reduces the radiation signal.

SUMMARY

An advantage of the embodiments described herein is that they overcome disadvantages of the prior art. These and other advantages may be achieved by a hybrid long-wave infrared (LWIR) microantenna design that, in an embodiment, includes four inner pie-shaped arms in which the four inner pie-shaped arms are in a double bow-tie configuration and a plurality of outer pie-shaped arms in which a subset of the outer pie-shaped arms is connected to the four inner pie-shaped arms and the pie-shaped arms are sensitive to electric fields and absorb radiation.

These and other advantages may be achieved by a hybrid long-wave infrared (LWIR) microantenna where the pie-shaped inner and outer arms are reconfigured to have a plurality of circumferential teeth. The reconfiguration results in four inner pie-shaped arms configured to have a plurality of circumferential teeth arranged in a double bow-tie configuration, a plurality of configured outer pie-shaped arms with a plurality of circumferential teeth, in which eight of these arms are connected to the four inner arms and four remain floating. The pie-shaped arms with circumferential teeth are sensitive to electric fields and absorb radiation, and provide output terminals for coupling the absorbed radiation as an output of the hybrid microantenna.

These and other advantages may also be achieved by a hybrid long-wave infrared (LWIR) microantenna where the pie-shaped inner and outer arms are reconfigured to have a plurality of circumferential teeth. The reconfiguration results in four inner pie-shaped arms configured to have a plurality of circumferential teeth arranged in a double bow-tie configuration, a plurality configured outer pie-shaped arms with a plurality of circumferential teeth, in which four outer pie-shaped arms are connected to the four inner pie-shaped arms. The pie-shaped arms are sensitive to electric fields and absorb radiation, and provide an output terminal for externally coupling an output of the hybrid microantenna.

These and other advantages may be achieved by a USSS pixel structure incorporating any of these and other embodiments of the hybrid microantenna.

DESCRIPTION OF THE DRAWINGS

The detailed description will refer to the following drawings, wherein like numerals refer to like elements, and wherein.

DETAILED DESCRIPTION

A hybrid microantenna is described herein. Embodiments of the hybrid microantenna achieve substantial improvements over conventional microantennas in terms of field of view and radiation absorption.

Apparatus incorporating the hybrid microantenna and revolutionary imaging sensor technology are also described herein. This sensor technology enables continuous remote imaging through fog, smoke, dust and clothing. These unprecedented capabilities are made possible by a new all silicon sensor technology that produces imagery using ambient black body radiation, over any spectral segment between 90 GHz and LWIR. This sensor technology is the ultra sensitive silicon sensor (USSS). Using microantennas, the USSS is tailored to specific spectral responses, for example, such as long-wave infrared (LWIR). Embodiments of the USSS approach are bolometer-based and are projected to achieve better than a 10× improvement over conventional bolometer approaches. These embodiments overcome the thermal loading problems inherent in bolometers.

Thermal loading problem circumvention in bolometers requires (1) minimizing thermal loading by the bridge legs [G2] to less than radiative loading through a 4☐ solid angle [GD] and (2) also reducing the thermal loading from GD. The first condition is equivalent to levitating each bolometer pixel. The second condition requires reducing self-radiation loading. These are difficult problems and are circumvented by using active thermal isolation instead of conventional passive thermal isolation.

Figure 3:
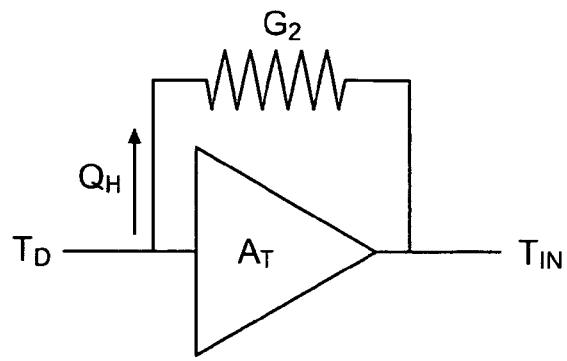
FIG. 3 is a circuit diagram illustrating and electro-thermal feedback circuit to eliminate thermal load.

With reference now to FIG. 3, one approach to make conductivity G2 approach the radiative limit is to use active thermal isolation that is mechanized by electro-thermal feedback. The basic concept is mathematically illustrated in FIG. 3, which shows that the effective conductance of a thermal link with conductance G2 can be made to approach zero. Electro-thermal feedback in FIG. 3 employs a thermal amplifier with thermal gain AT. Analogous to an electrical amplifier that amplifies voltage, the thermal amplifier amplifies temperature. Hence, the thermal amplifiers output (TIN) and input (TD) temperatures depend on the amplifier's gain AT, and TIN=ATTD. The thermal loading on the amplifier's input node by G2 depends on the thermal conductivity of G2 and the thermal amplifier's gain AT. The thermal amplifier is configured to present no thermal load at the input node, at temperature TD. The loading on the input node depends on the thermal current QH flowing through G2, and this is given as:

(2)

Accordingly, the effective loading at node TD by G2 depends on the thermal amplifier's gain and results in an effective conductance, GEFF. By adjusting the thermal amplifier's gain to unity, GEFF can be made to go to zero. The idea of making the effective conductance of G2 approach zero is what is used to minimize thermal loading inside a bolometer and its mechanization is described next.

Figure 1:
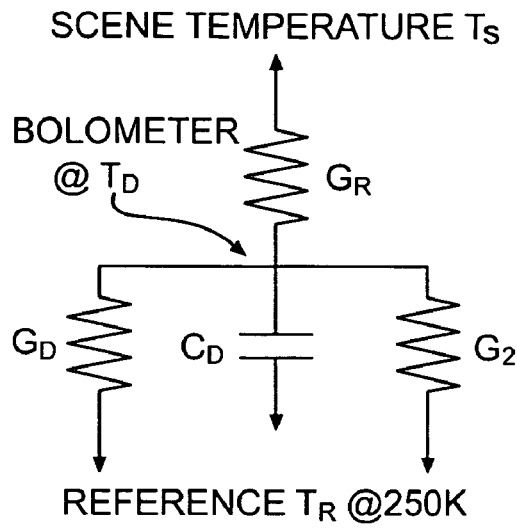
FIG. 1 is a diagram illustrating a conventional bolometer's equivalent thermal circuit.
Figure 2:
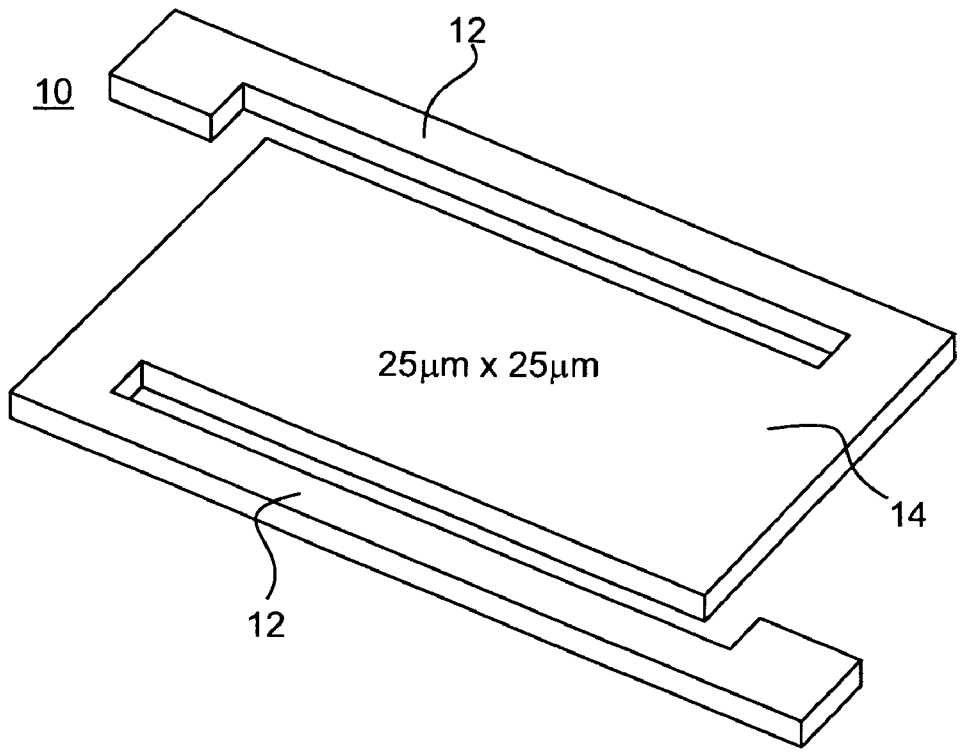
FIG. 2 is a diagram illustrating a conventional bolometer.
Figure 4:
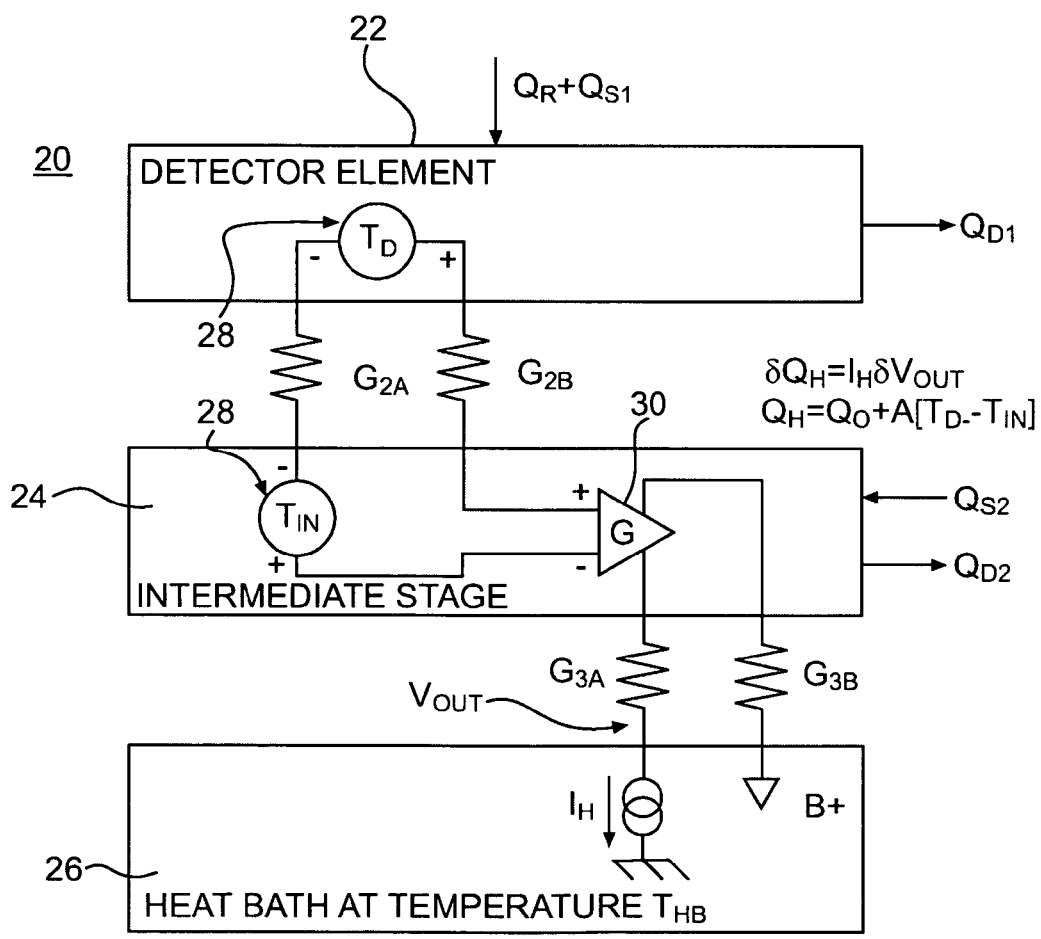
FIG. 4 is a block diagram illustrating a three-tier USSS pixel structure.

Electro-thermal feedback is incorporated into each pixel by including an intermediate temperature stage whose temperature is controlled by a thermal amplifier (described below). With reference now to FIG. 4, shown is a three-tier USSS pixel structure 20 in which a detector 22 is attached to an intermediate temperature stage 24 and the intermediate stage is attached to a heat bath 26. The USSS pixel structure 20 achieves ideal thermal isolation with electro-thermal feedback, which is mechanized by varying the intermediate stage's temperature TIN in concert with changes in the detector's temperature TD. As such, the intermediate temperature stage 24 provides electro-thermal feedback to provide thermal isolation for the detector 22. In a conventional bolometer (such as shown in FIG. 1), the detector element would be directly connected to a substrate (here labeled as a thermal bath) through bridge legs G2A and G2B, and these would also be used for readout. The USSS detector 22 includes a silicon diode 28 for temperature sensing. Two thermal links G2A and G2B connect the detector stage 22 to the intermediate stage 24. These links provide for mechanical support and electrical readout of the detector's temperature. A second silicon diode 28 and a voltage amplifier 30 with gain G>>1 is built into the intermediate stage 24. Four thermal isolation lines G3A and G3B and G3D (not shown) provide mechanical and electrical linkage between the intermediate stage 24 and the heat bath 26 (outside world). One line provides B+ to the amplifier, and the other provides a constant current IH, another provides dc bias for the amplifier, and the fourth line is used for removing dc threshold offsets and 1/f noise components once every pixel integration time. The thermal conductance of these links is G3A, G3B, G3C and G3D.

The purpose of the thermal amplifier [mechanized with the voltage amplifier 30, the two temperature sensors 28, and the heat bath 26] is to equalize the intermediate stage's temperature with the detector stage's (element's) temperature. This equalizations needs to provide bi-directional temperature control. Bi-directionality is achieved by combining the heat from the voltage amplifier 30 with cooling from the heat bath through conductances G3A and G3B and G3C and G3D. The intermediate stage temperature is raised or lowered by adjusting the voltage amplifier's 30 power consumption in combination with cooling from the heat bath 26. The heat bath 26 determines the minimum equalization temperature and voltage amplifier's maximum power consumption determines the maximum equalization temperature.

The temperature difference between the intermediate stage 24 and the detector stage 22 controls the voltage amplifier's 30 heat output. Two back to back connected silicon temperature-sensing diodes 28 provide a voltage signal proportional to the temperature difference between the absorber element (detector stage 22) and intermediate stage 24. The voltage difference signal $\Box$(TD−TIN), [where $\Box$ $\Box$−1.5 mV/K] is amplified by the voltage amplifier 30 with a gain G>>1 to provide a voltage signal VOUT. Since the voltage amplifier 30 operates at a constant current IH, the power consumed by the voltage amplifier 30 (corresponding to the heat delivered to the intermediate stage 24) is proportional to the voltage VOUT. Specifically, voltage amplifier's 30 output power is QH=IH[B+−G $\Box$(TD−TIN)]=QO+A[TD−TIN], where A=IHG$\Box$ and QO=IHB+. Since active feedback equalizes the intermediate 24 and detector 22 stages' temperatures, the VOUT signal is proportional to the scene temperature $\Box$TS.

The efficacy of the electro-thermal feedback is calculated with energy balance equations at the detector stage 22 and intermediate stage 24. The detector stage 22 is assumed to have a heat capacity CD and receives radiative energy from the scene [QR] and radiation shields [QS1]. The detector stage 22 also radiates energy [QD1] through a 4$\Box$ angle and contacts the intermediate stage 24 through thermal links G3=G3A+G3B+G3C+G3D. Rearranging terms in the energy balance equations at the detector stage 22 and intermediate stage 24, after taking their differential, Equation (3) is obtained. Equation (3) relates scene temperature changes to temperature changes caused at the detector stage 22. Effects of electro-thermal feedback appear explicitly in Equation 3. Equation 3 reveals that for large electro-thermal feedback A [A>>{G2, G3, GD2}], differential temperature changes in the detector stage 22, $\Box$TD, are essentially equal to temperature changes in the intermediate stage 24, $\Box$TIN: this confirms the assertion that the effective thermal conductivity of G2A and G2B approach zero.

(3)

This assertion is corroborated with further analysis that relate changes in the detector's temperature, $\Box$TD, to changes in the scene's temperature, $\Box$TS, and these are given by, (4)

Equation 4 shows that for large A>>{G2, GD2, G3} thermal loading by G2 is effectively eliminated (compare with Equation 1). Consequently, signal attenuation due to thermal loading is limited to the ratio of the radiative conductivity between the scene and the detector 22 [GR] divided by the radiative conductivity between the detector 22 and its surroundings [GD2].

Figure 5:
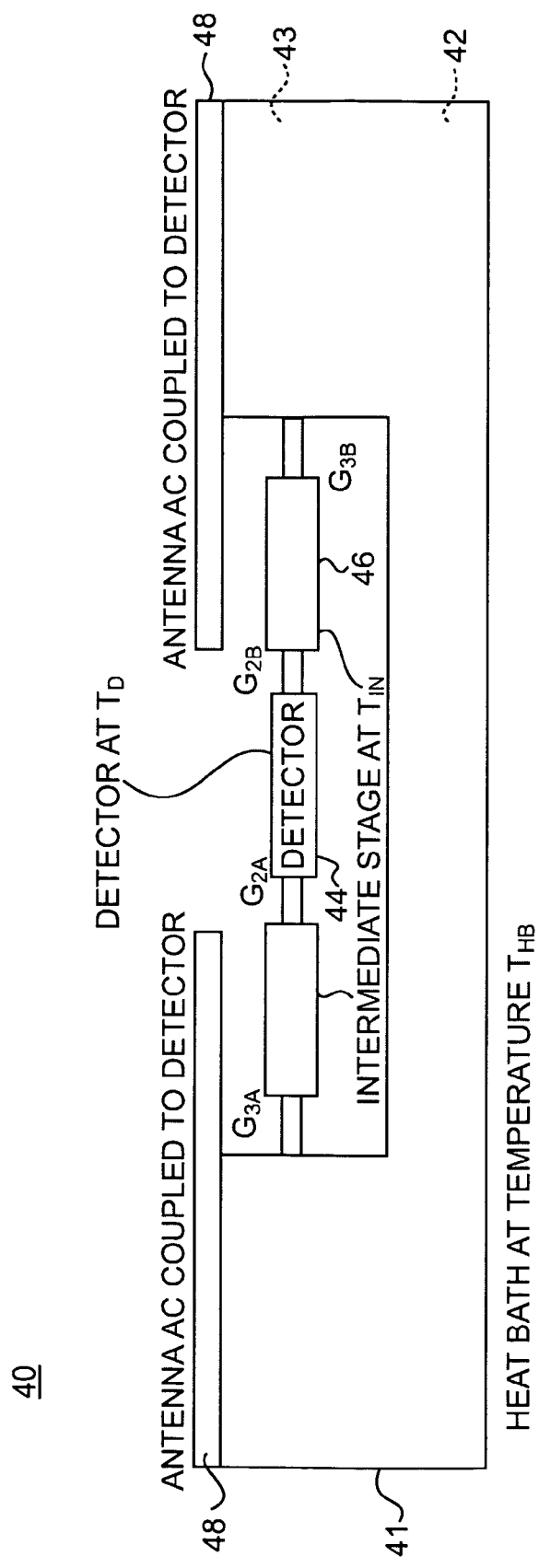
FIG. 5 is a block diagram illustrating an embodiment of a microantenna apparatus incorporating a USSS pixel structure.

With reference now to FIG. 5, shown is another USSS pixel structure 40. As shown, USSS pixel structure 40 has several tiers but the active silicon circuits are on only one tier. Heat bath 41 includes the entire silicon wafer substrate and has an upper (second tier) 43 and a lower portion (first tier) 42 with no active silicon circuits. The detector 44 and intermediate stages 46, are formed in the second tier 43 which is above the lower portions (first tier) 42 of the heat bath 41. Active silicon circuits in the heat bath stage 41 are located on heat bath's upper portion (second tier) 43, and are coplanar with the active silicon circuits in the intermediate 46 and detector stages 44. All the active silicon circuits are formed in the second tier 43 formed on front surface of the silicon wafer. The active circuits include temperature sensors, voltage amplifiers, x-y address circuitry. The heat bath 41, intermediate 46 and detector stages 44 are made in silicon to facilitate production and low cost, however other semiconductor materials can be use for this purpose. The third tier is microantenna 48 and is made from a high conductivity low loss metal. The third tier is formed over the second tier 43 with has the active circuits. The microantenna's 48 load stage is located on the detector stage 44. The main body of the microantenna 48 may be located on the heat bath 41, or the intermediate stage 46, or on both of these stages. At LWIR the pixel is small and the main body of the microantenna 48 is located on the intermediate stage 46. At longer wavelengths, particularly at mm-wavelengths, the outer portions of the microantenna 48 are located on the heat bath 41 and the inner portions are located on the intermediate stage 46, with the load stage located on the detector stage 44.

Replacing the vertical layout with three tiers of active circuits (shown in FIG. 4) with a layout where all the active circuits are located on a single tier (see FIG. 5) is desirable for it greatly simplifies the USSS fabrication. Such a layout change is accomplished by shrinking the detector 44 area to a size that is much smaller than the pixel area (compare the detector size in FIGS. 4 and 5). Simplifying the fabrication by shrinking the detector size, as shown in layout in FIG. 5, is at the cost of a large reduction in the pixel's fill factor, or large signal reduction.

Pixel fill factor efficiency is recovered by adding microantenna 48 (or microlenses) to focus the radiation incident on a pixel onto a smaller area subtended by the detector 44. Furthermore, reducing detector 44 to minimum size also minimizes thermal loading from self black body radiation. Reducing detector 44 size directly reduces by an area ratio the self radiative loading on detector 44. Microantenna 48 (or microlens) compensate for detector area reduction by "funneling" the radiation incident on the pixel onto detector 44. Microantenna 48 and detector coupling circuits are tuned resulting in smaller radiative loading from the microantenna 48. The tuned coupling circuits couple the self radiative thermal loading by microantenna 48 over the tuned spectral band and this is less than from a black body equal to microantenna's 48 size.

Figure 6A:
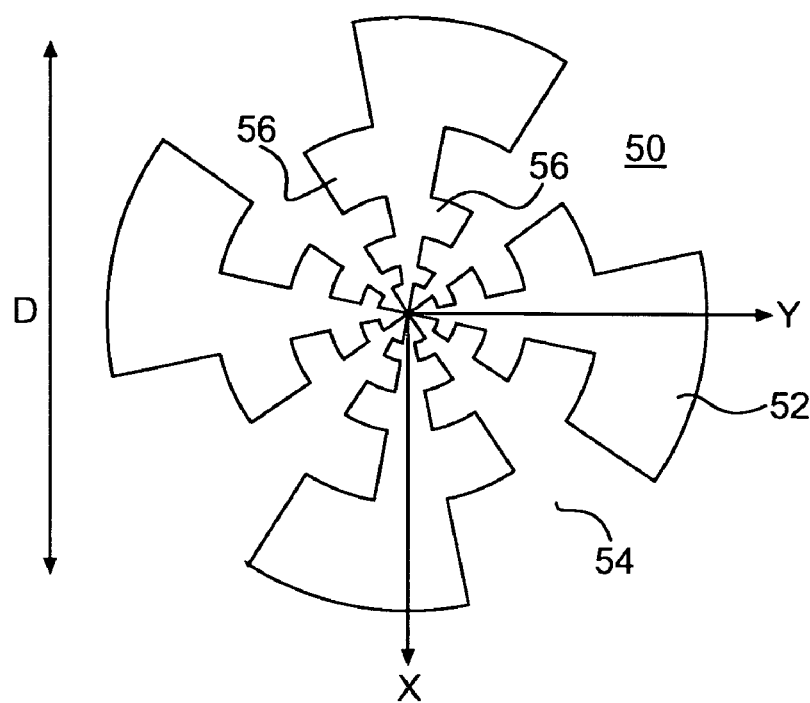
FIG. 6A is a diagram illustrating a conventional microantenna.
Figure 6B:
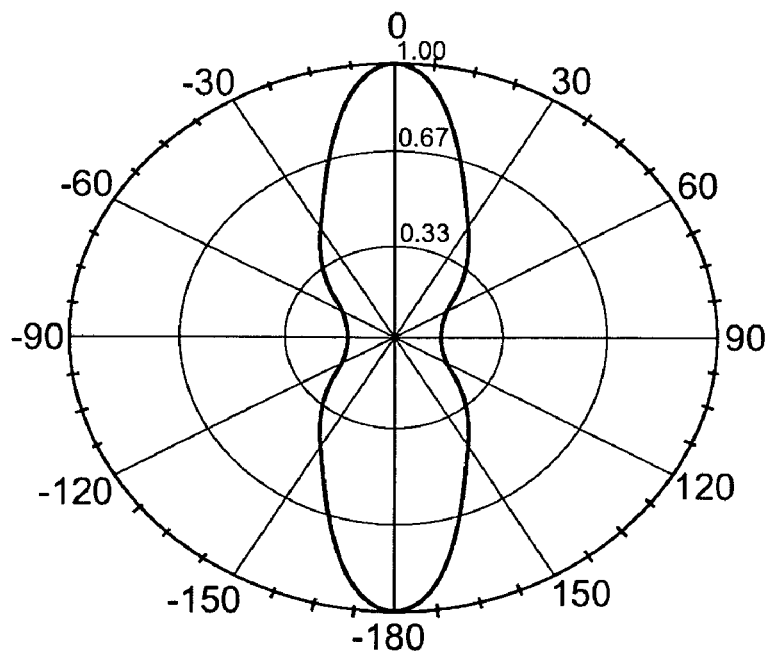
FIG. 6B is a diagram illustrating a field-of-view of the conventional microantenna shown in FIG. 6A.

It should be evident that microantennas are an important element in the USSS approach. Microantenna 48 ultimately limits the amount of radiation received by detector 44. For maximum radiation bandwidth it is recommended that the microantenna 48 design be based on Babinet's approach: the microantenna's metal area is made equal to the open area. With reference now to FIGS. 6A and 6B, shown is conventional, toothed log periodic design microantenna 50 illustrating a microantenna design based on Babinet's approach. Specifically, microantenna 50 is based on a double bow-tie complementary area design in which metal areas (pie-shaped sections or arms) 52 equal in area to open areas 54. The four arms 52 are each formed from a pie shaped arm by making virtual circumferential cuts and rotating the pieces alternatively clockwise and counter-clockwise to form teeth in each arm. Such an operation transforms each pie-shaped arm 52 into a toothed arm 56 with teeth pointing in the circumferential direction, alternating between facing or pointing clockwise and counter-clockwise, as shown in FIG. 6A.

Examining the design illustrated in FIG. 6A reveals that the LWIR active area is only the center area of about 15 μm in diameter (where D is equal to 50 μm). FIG. 6B illustrates toothed log periodic microantenna 50 field-of-view ("FOV"), which is narrow. Specifically, FIG. 6B illustrates the pattern of radiation absorbed by microantenna 50, with Φ=0 degrees. The diameter of the LWIR toothed log periodic microantenna 50 is dictated by the USSS layout. Specifically, the area needed to mechanize the electro-thermal thermal feedback on one level requires about 50 µm. Having a microantenna with a narrow FOV and only active in the center 15 µm portion is unacceptable for two reasons. First, sensitivity at LWIR only in the center 15 µm portion is grossly insufficient to recover pixel fill factor efficiency since radiation falling outside this area in a 50 µm pixel is not channeled into the detector stage: not detected. Second, a narrow FOV further reduces the radiation signal because it limits the detector to operate with slow optics.

Hybrid Microantenna

Figure 7:
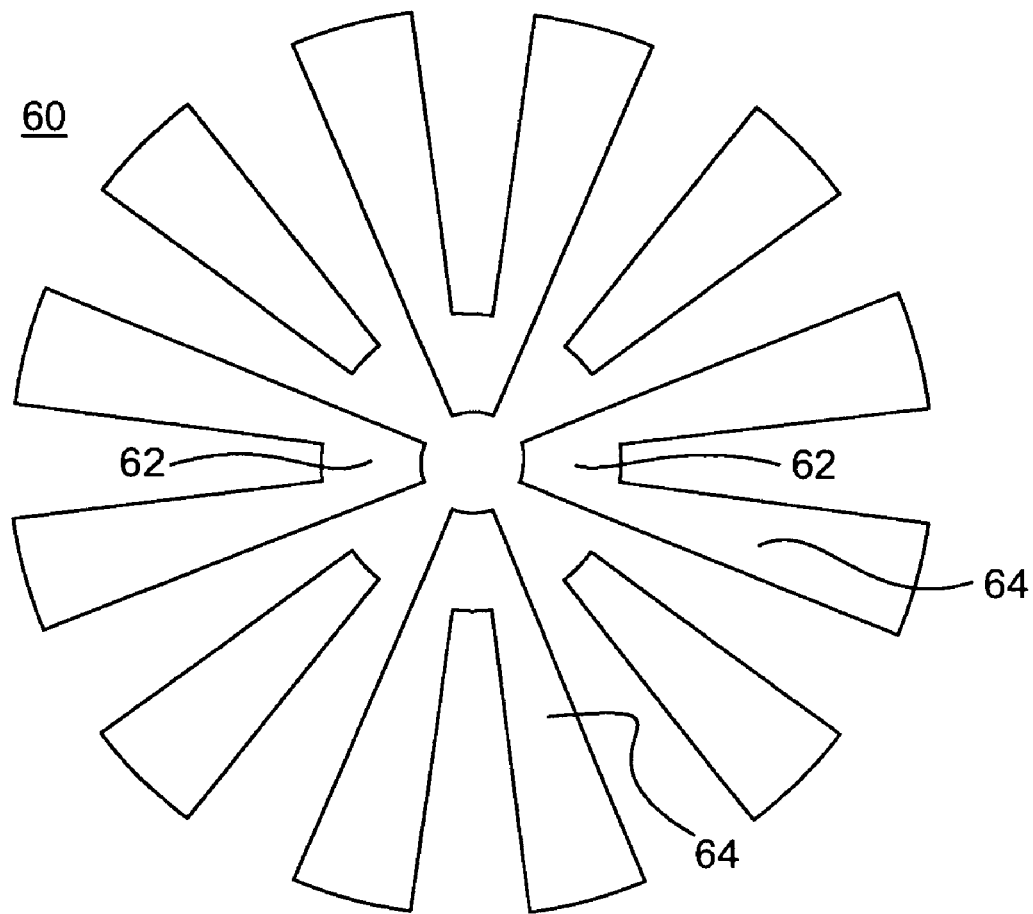
FIG. 7 is a diagram illustrating an embodiment of a pie-shaped microantenna design.

A basis for a hybrid microantenna design 60, shown in FIG. 7, overcomes the above-described limitations with conventional microantenna approaches. Hybrid microantenna 60 is based on a double bow-tie complementary area design, shown in FIG. 6A, incorporating circumferential teeth. In FIG. 7, the inner most portion includes two bow-tie portions, formed by four inner pie-shaped segments or arms 62, connected to outer bow-tie portions, formed by twelve outer pie-shaped segments or arms 64. The maximum circumferential sizes of the inner and outer pie shaped segments are equal. This is made possible by increasing the number of pie shaped segments (shown in FIG. 6A) from 4 to 4 (n+1), where n is odd.

Hybrid microantenna design 60 was achieved by examining the design principle behind toothed log periodic microantenna 50 shown in FIG. 6A. Toothed log periodic microantenna 50 is based on the simple bow-tie microantenna with four arms (i.e., pie-shaped arms 52). The original four arm bow-tie microantenna 50 (neglecting the outer diameter) is sensitive primarily to electric fields in the radial direction. Breaking up each arm of bow-tie microantenna 50 into circumferential segments makes the four arm bow-tie microantenna 50 sensitive to electric fields in the circumferential direction. The teeth 56 in the circumferential direction are formed by breaking up each bow-tie arm into circumferential segments and sliding these segments alternatively right and left to obtain the shape shown in FIG. 6A. This reconfiguration produces new edges and makes the microantenna 50 sensitive to circumferential electric fields. Moreover, the size of each one of these circumferential teeth 56 is adjusted to approximately equal a quarter of a wavelength. Increasing the diameter of the microantenna 50 beyond diameter "D" will make the circumferential edges larger and thereby extend the microantenna 50 frequency response to a longer wavelength. This frequency extension to longer wavelength is without any improvement in the short wavelength response. Recognizing this limitation, hybrid microantennas based on the microantenna 60 shown in FIG. 7 were created.

With continuing reference to FIG. 7, it is instructive to start with a bow-tie type microantenna structure. Consider microantenna 50 in FIG. 6A equal open areas 54 and metal areas 52; the same is true for hybrid microantenna 60 in FIG. 7. As shown, the double bow-tie is in the center and periodic every 90 degrees. The outer section contains twelve (12) pie-shaped segments 64 connected to inner double bow-tie 62. The ratio between the number of inner pie-shaped segments 62 and outer pie-shaped segments 64 is odd: 4(n+1) where n is even. An odd relationship is used to obtain a 180 degree phase shift between the left and right sides of hybrid microantenna 60 feeding two input terminals (not shown). The circumferential arc lengths of inner pie-shaped segments 62 and outer pie shaped segments 64 are equal. Equalization of the circumferential arc lengths is made possible by increasing the number of outer pie shaped segments 64 (12 here) relative to inner pie shaped segments 62 (4 here). In FIG. 7, the hybrid microantenna has two outer pie shaped segments 64 connected to each inner pie shaped segment 62; leaving four arms (outer pie shaped segments 64) floating. Another hybrid microantenna embodiment connects one outer segment to each inner segment, leaving eight outer segments floating (see FIG. 11). Analysis of both hybrid microantenna configurations is described below.

Figure 8:
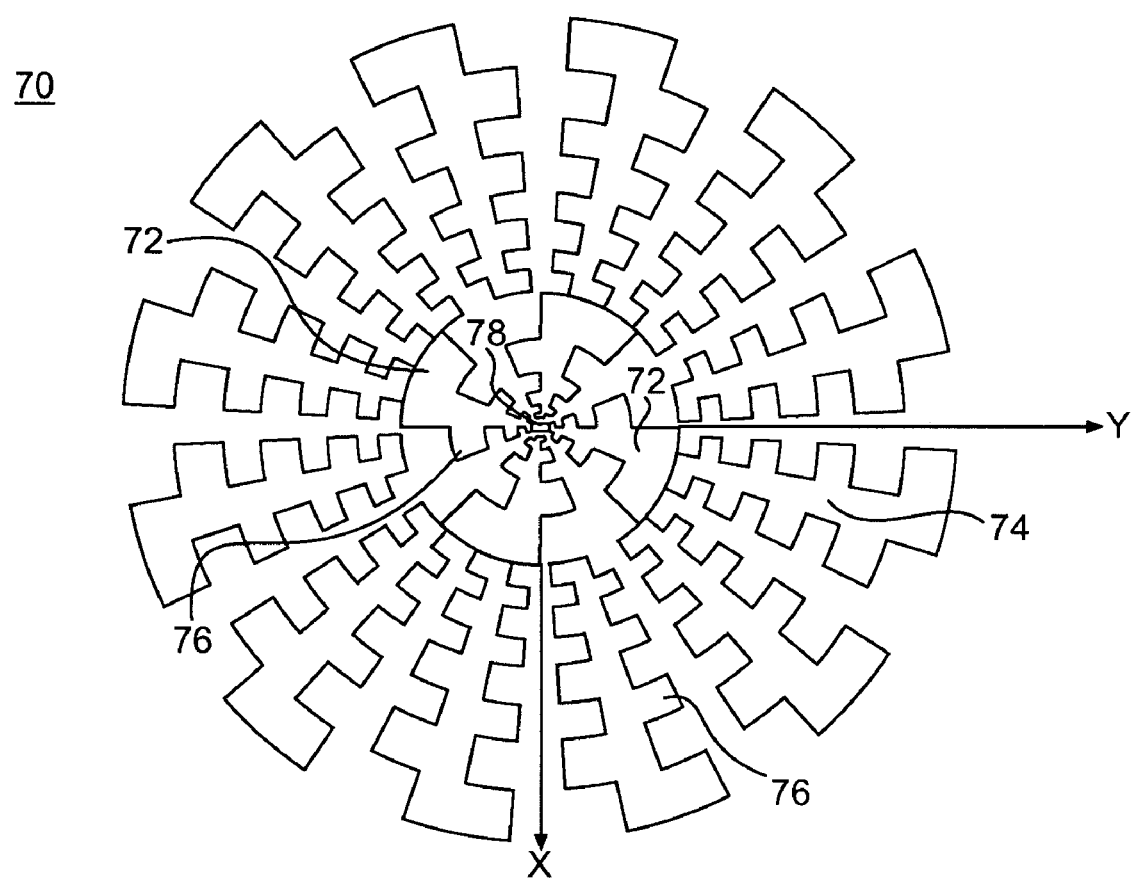
FIG. 8 is a diagram illustrating an embodiment of hybrid USSS LWIR microantenna.

With reference now to FIG. 8, shown is a novel, complementary toothed log periodic hybrid LWIR microantenna 70, based on hybrid microantenna design 60. Hybrid microantenna 70 may be made from metals, such as Gold, Silver, Aluminum, or other high electrical conductivity materials. Hybrid microantenna 70 includes four inner pie-shaped segments or arms 72 and twelve outer pie-shaped segments or arms 74. Each outer arm 74 includes alternating, circumferential direction teeth 76. Each inner arm 72 also includes alternating, circumferential teeth 76. In essence, hybrid microantenna 70 is conventional microantenna 50 with the addition of twelve outer arms 74. Hybrid microantenna 70 provides a significant improvement in pixel area efficiency over conventional microantennas. As in FIG. 7, eight outer arms 74 are connected to inner arms 72, while four outer arms 74 are floating (not connected to inner arms 72). Hybrid microantenna 70 includes two output terminals 78 at its center. Output terminals 78 couple the hybrid microantenna 70 output though a coupling structure to a load located on the detector stage, such as detector 44 in FIG. 5, providing hybrid microantenna 70 to detector 44 and USSS pixel structure 40.

Hybrid microantenna 70 is formed by transforming the hybrid microantenna 60, shown in FIG. 7, into a complementary toothed log periodic design, as was described above with reference to double bow-tie microantenna 50 (shown in FIG. 6). Specifically, each one of the pie-shaped arms 72 and 74 is circumferentially cut and the ring segments are rotated to create toothed complementary log periodic hybrid microantenna 70. Formation of these log periodic teeth 76 makes hybrid microantenna 70 sensitive to circumferential electric field. Each tooth 74 equals about one quarter of a wavelength. Summing the phase change across the metallic teeth, and the open areas between them, we compute the total phase change around the circumference of the four inner arms and it is equal to 2□. By design, the outer circumference (i.e., defined by the outer circumferential pie-shaped segments or arms 74) of hybrid microantenna 70 is three times longer then inner portion (i.e., double bow-tie, inner pie-shaped segments or arms 72). Consequently, the phase change is three times larger, or equal to 6□. The outer microantenna portion (arms 74) is sensitive to the third harmonic of the circumference by virtue of circumferential teeth size is equal to a ¼ wavelength.

The impedance of hybrid microantenna 70 shown in FIG. 8 is illustrated in Chart 1 below. The impedance plotted in Chart 1 is represented in terms of real (top curve) and imaginary (bottom curve). Beyond 20 THz, the impedance of hybrid microantenna 70 is about 240 ohms with a very small imaginary component. The impedance remains flat to about 40 THz, thereby covering the LWIR spectrum.

Chart 1

Figure 9:
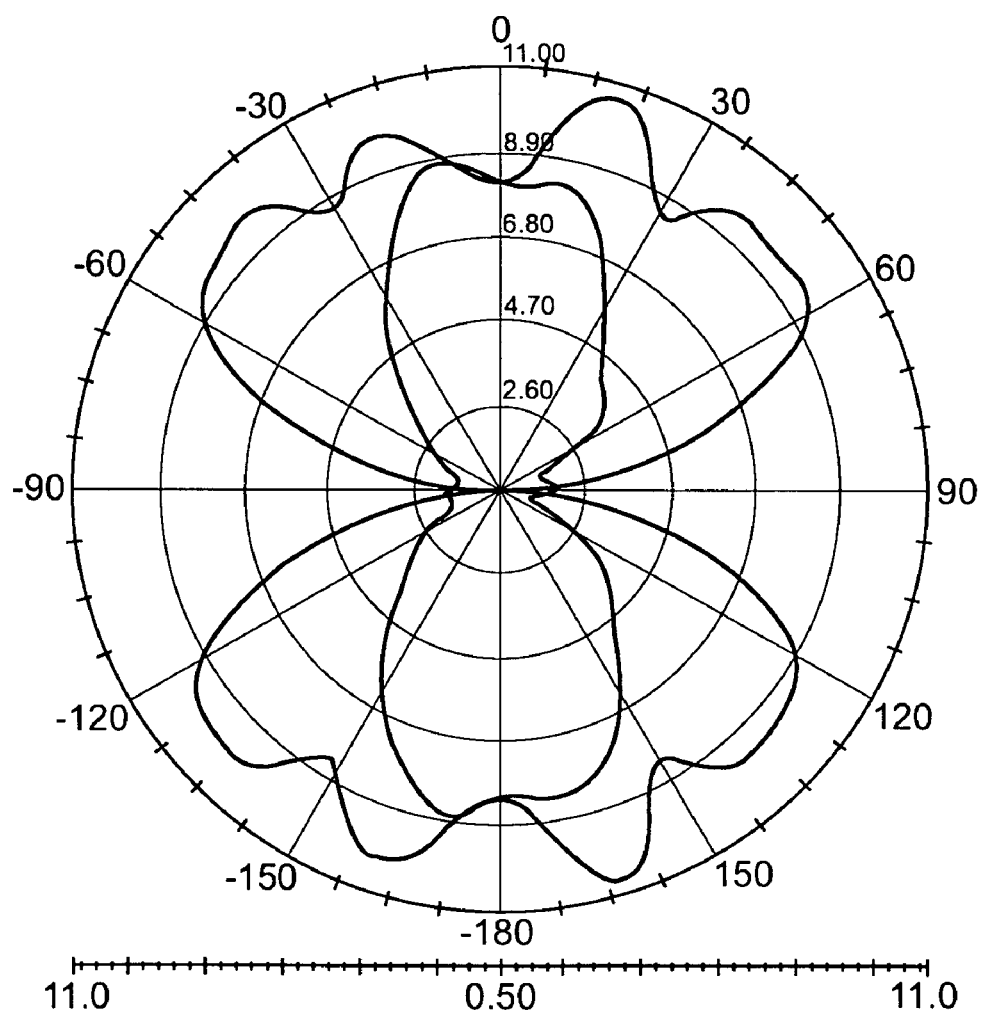
FIG. 9 is a diagram illustrating a field-of-view of the hybrid USSS LWIR microantenna shown in FIG. 8.

Analysis of radiation patterns absorbed by hybrid microantenna 70 is shown in FIG. 9. The radiation patterns are for Electric field polarization parallel (Φ=0 degrees solid line) and perpendicular (Φ=90 degrees dashed line) to the circumferential teeth. These radiation patterns illustrate the FOV of hybrid microantenna 70. The FOV of view shown in FIG. 9 is very broad and for fast optics it will be limited by the optics F#. A comparison of the FOV shown in FIG. 9 to the FOV of conventional microantenna 50 shown in FIG. 6B illustrates the increased FOV for the hybrid microantenna.

Figure 10A:
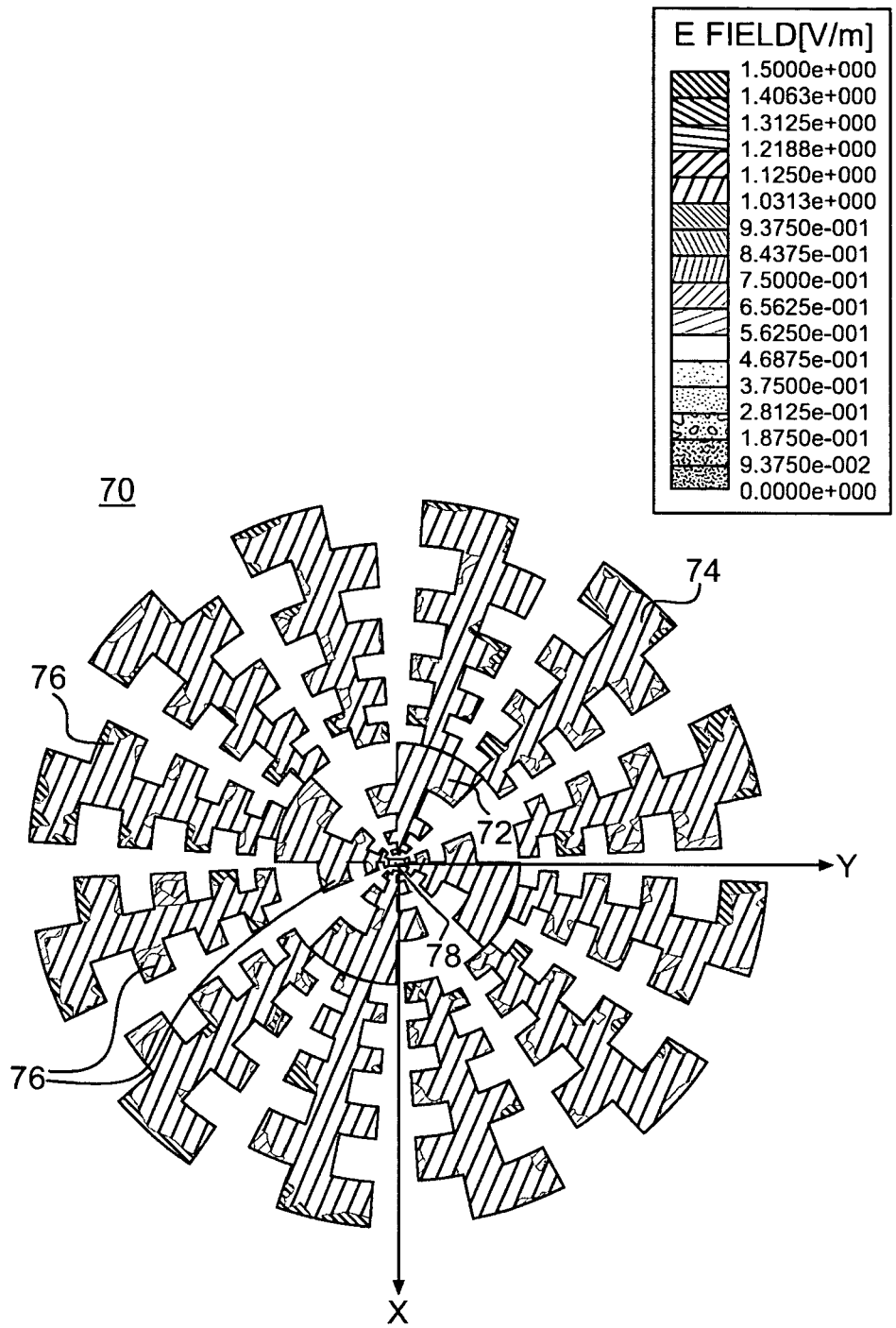
FIGS. 10A-10B are diagrams illustrating radiation absorption of an embodiment of hybrid USSS LWIR microantenna.
Figure 10B:
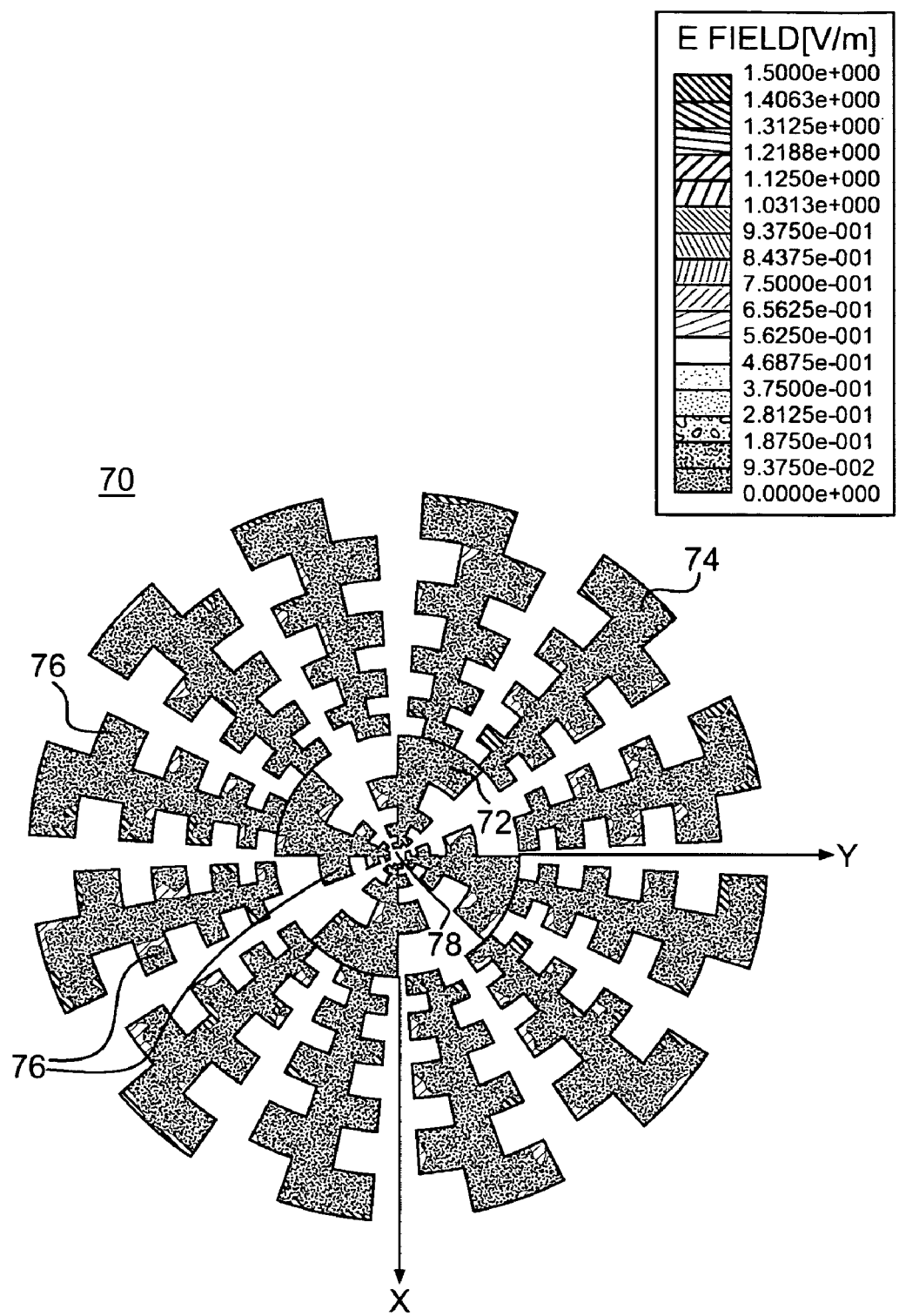

The absorption by hybrid microantenna 70 was modeled with the Ansoft Corporation HFSS™ (High-Frequency Structure Simulator) program. The results of the modeling are shown in FIGS. 10A and 10B, which illustrate radiation absorption on hybrid microantenna 70. The modeling reveals that absorption occurs over the entire 50 μm pixel area. For a sinusoidal Electric field, FIG. 10A illustrates absorption at a maximum E-field, with absorption represented by darker areas at edges of the hybrid microantenna 70. Absorption for a minimum E field is illustrated in FIG. 10B with the absorption represented by lighter areas at edges of hybrid microantenna 70. As previously discussed, the microantenna 70 output at terminals 78 is connected to an AC coupling circuit to couple the absorbed radiation to a load located on the detector stage, such as detector 44 in USSS pixel structure 40. An entire sensor apparatus may comprise hybrid microantenna 70 coupled to USSS pixel structure 40. The edges of the complementary log periodic teeth in the hybrid microantenna provide this high absorption efficiency of the black body radiation incident on the microantenna.

Figure 11:
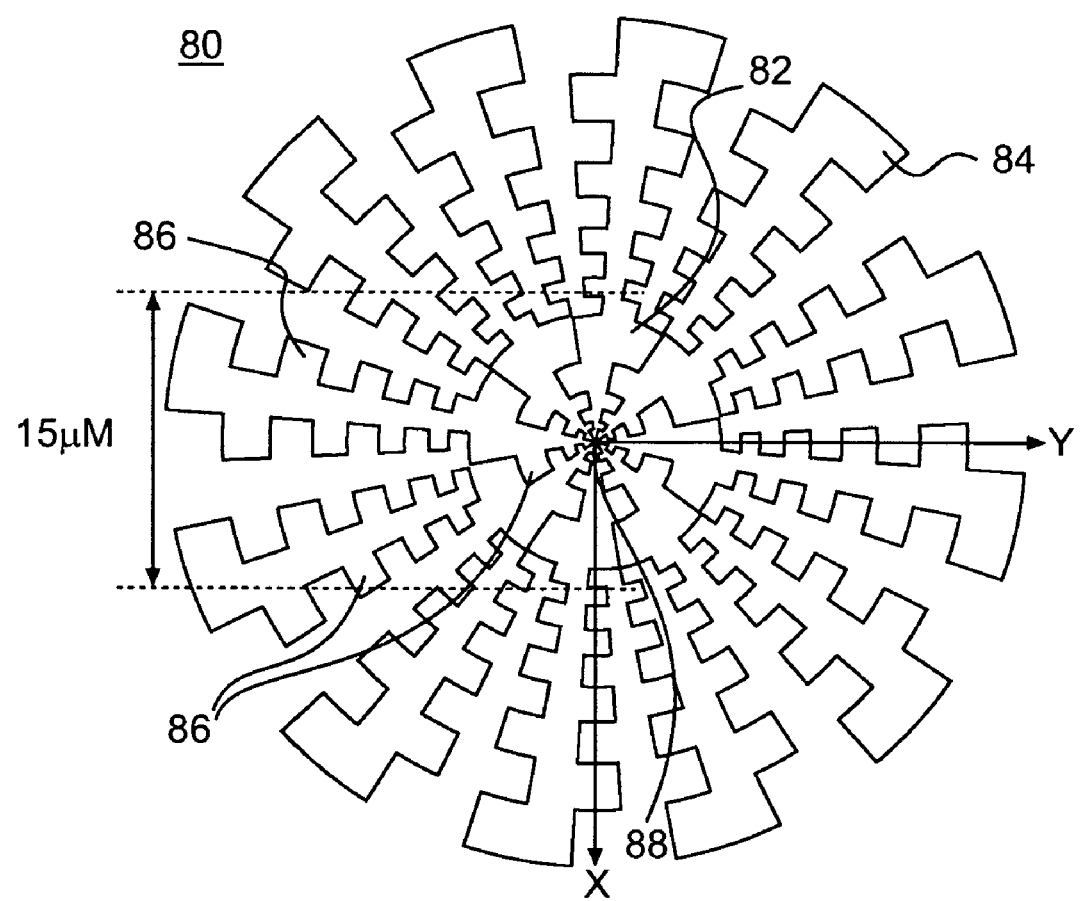
FIG. 11 is a diagram illustrating another embodiment of hybrid USSS LWIR microantenna.

With reference now to FIG. 11, shown is 50 μm diameter LWIR hybrid microantenna 80. Like hybrid microantenna 70 shown in FIG. 8, hybrid microantenna 80 includes four inner pie-shaped segments or arms 82, twelve outer pie-shaped segments or arms 84, circumferential teeth 86 on both inner arms 82 and outer arms 84 and output terminals 86 in the center. The diameter of the dual inner bow-tie (inner arms 82) is 15 μm, as shown. As with hybrid microantenna 70 above, output terminals 88 connect hybrid microantenna 80 to detector stage (such as detector 44 in USSS pixel structure 40) through an AC coupling structure. An entire sensor apparatus may comprise hybrid microantenna 80 coupled to USSS pixel structure 40. Unlike, hybrid microantenna 70, however, only four (4) outer arms 84 are connected to four (4) inner arms 82, leaving eight (8) outer arms 84 floating. In FIG. 9, there are 8 outer arms connected to four inner arms, leaving 4 outer arms floating. Impedance for hybrid microantenna 80, as compared to conventional microantenna 50 (4 arm) is shown below in Chart 2. The impedance in Chart 2 is presented in terms of the real (top two curves) and the imaginary (bottom two curves) parts. For best performance the imaginary impedance part should be close to zero and the real part matched to the impedance of free space.

Chart 2

Figure 12:
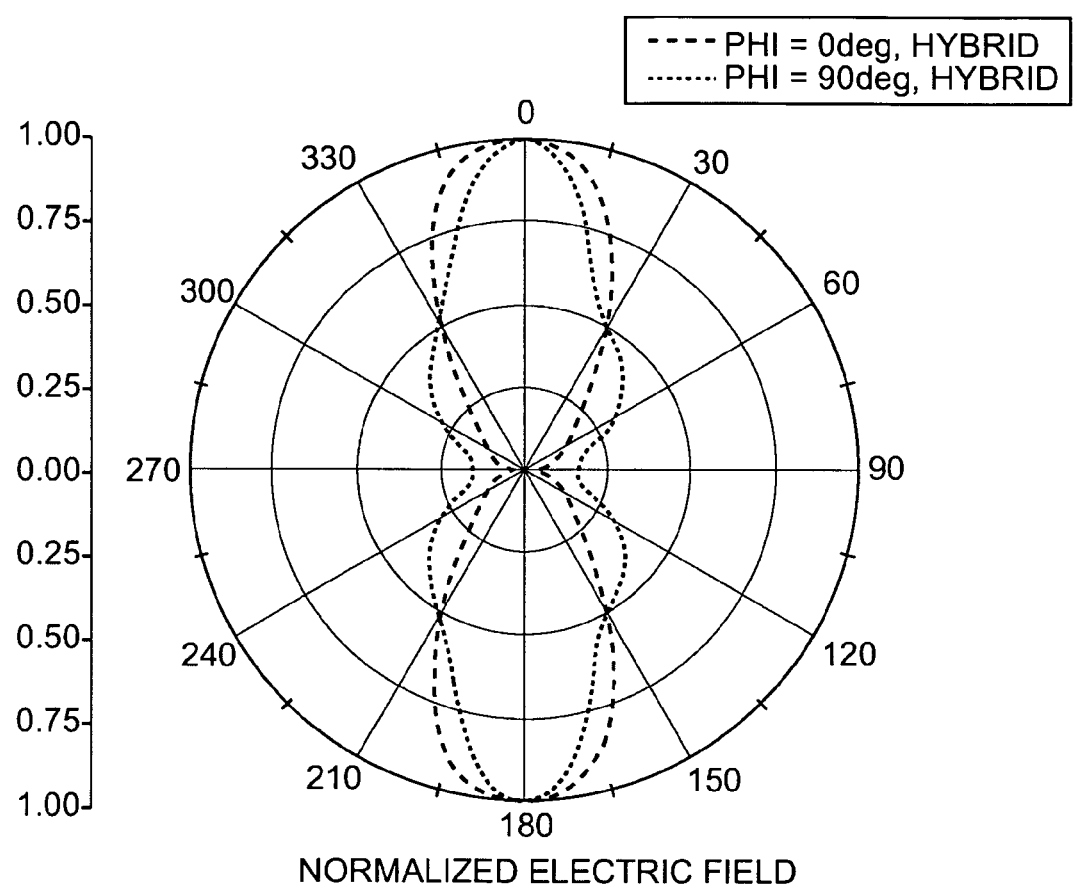
FIG. 12 is a diagram illustrating a field-of-view of the hybrid USSS LWIR microantenna shown in FIG. 11.

The FOV of LWIR hybrid microantenna 80 is shown in FIG. 12. As above, the FOV radiation patterns are for Φ=0 degrees (solid line) and Φ=90 degrees (dashed line). The FOV for microantenna 80 is narrower than for microantenna 70 because the number of outer arms connected to each of the four inner arms is different: one for microantenna 80 and two for microantenna 70. While the FOV for the hybrid microantenna 80 is not as wide as for hybrid microantenna 70, the FOV shown is sufficiently wide. The FOV in FIGS. 6B, 9 and 12 are shown for the same size microantennas, 50 μm. However, the hybrid microantennas absorb radiation over the entire 50 μm area whereas the conventional microantennas do not. This is demonstrated in Chart 3, below, which shows that the hybrid microantenna 80 has increased power reception. The curves compare hybrid LWIR microantenna 80 to the original four arm microantenna 50 and a simple 12 arm microantenna. The power reception of hybrid microantenna 70 is not as good as the power reception of hybrid microantenna 80.

Chart 3

The terms and descriptions used herein are set forth by way of illustration only and are not meant as limitations. Those skilled in the art will recognize that many variations are possible within the spirit and scope of the invention as defined in the following claims, and their equivalents, in which all terms are to be understood in their broadest possible sense unless otherwise indicated.

The invention claimed is:

1. A hybrid long-wave infrared (LWIR) microantenna, comprising:
    four inner pie-shaped arms in which the four inner pie-shaped arms are in a double bow-tie configuration;
    a plurality of outer pie-shaped arms in which a subset of the outer pie-shaped arms is connected to the four inner pie-shaped arms and the pie-shaped arms are sensitive to electric fields and absorb radiation, wherein the subset of the outer pie-shaped arms contains less than all of the plurality of outer pie-shaped arms; and
    at least one of the plurality of outer pie-shaped arms does not connect to any of the four inner pie-shaped arms.

2. The hybrid LWIR microantenna of claim 1 in which the outer pie-shaped arms each include a plurality of alternating, circumferential teeth that make the hybrid microantenna sensitive to a circumferential electric field.

3. The hybrid LWIR microantenna of claim 2 in which the circumferential teeth each equal approximately one quarter of a wavelength in width.

4. The hybrid LWIR microantenna of claim 1 in which the inner pie-shaped arms each include a plurality of alternating, circumferential teeth.

5. The hybrid LWIR microantenna of claim 1 in which outer edges of the plurality of outer pie-shaped arms together define an outer circular circumference and outer edges of the four inner pie-shaped arms together define an inner circular circumference and the outer circumference is three times longer than the inner circumference.

6. The hybrid LWIR microantenna of claim 1 comprising twelve outer pie-shaped arms.

7. The hybrid LWIR microantenna of claim 6 in which eight of the outer pie-shaped arms are connected to the four inner pie-shaped arms.

8. The hybrid LWIR microantenna of claim 6 in which four of the outer pie-shaped arms are connected to the four inner pie-shaped arms.

9. The hybrid LWIR microantenna of claim 1 in which each inner pie-shaped arm is connected to two outer pie-shaped arms.

10. The hybrid LWIR microantenna of claim 1 further comprising a plurality of output terminals for coupling an output of the hybrid microantenna to an external input.

11. The hybrid LWIR microantenna of claim 1 in which the four inner pie-shaped arms define an open area and the area of the open are is equal to the area of the four inner pie-shaped arms.

12. The hybrid LWIR microantenna of claim 1 in which the outer pie-shaped arms define an open area and the area of the open are is equal to the area of the outer pie-shaped arms.

13. An ultra sensitive silicon sensor (USSS) pixel structure comprising the hybrid LWIR microantenna of claim 1.

14. The USSS structure of claim 13 further comprising:
    a heat bath;
    a detector, in which the detector is connected by an AC coupling circuit to the output of the hybrid microantenna; and
    an intermediate temperature stage connected to the detector stage by bridges, in which the intermediate temperature stage provides electro-thermal feedback to achieve thermal isolation for the detector stage.

15. The USSS structure of claim 14 in which the heat bath includes a bottom portion that forms a first tier and a top portion that forms a second tier, the detector and the intermediate stages form a second tier coplanar with the heat bath's second tier and the hybrid LWIR microantenna forms a third tier.

16. A hybrid long-wave infrared (LWIR) microantenna, comprising:
    four inner pie-shaped arms including a plurality of circumferential teeth, in which the four inner pie-shaped arms are in a double bow-tie configuration;
    a plurality of outer pie-shaped arms including a plurality of circumferential teeth, in which eight of the plurality of outer pie-shaped arms are connected to the four inner pie-shaped arms and the pie-shaped arms are sensitive to electric fields and absorb radiation;
    at least one of the plurality of outer pie-shaped arms does not connect to any of the four inner pie-shaped arms; and
    output terminals for externally coupling an output of the hybrid microantenna.

17. The hybrid LWIR microantenna of claim 16 in which each inner pie-shaped arm is connected to two outer pie-shaped arms.

18. A hybrid long-wave infrared (LWIR) microantenna, comprising:
    four inner pie-shaped arms including a plurality of circumferential teeth, in which the four inner pie-shaped arms are in a double bow-tie configuration;
    a plurality outer pie-shaped arms including a plurality of circumferential teeth, in which four of the plurality outer pie-shaped arms are connected to the four inner pie-shaped arms and the pie-shaped arms are sensitive to electric fields and absorb radiation;
    at least one of the plurality outer pie-shaped arms does not connect to any of the four inner pie-shaped arms; and
    output terminals for externally coupling an output of the hybrid microantenna.

19. The hybrid LWIR microantenna of claim 18 in which each inner pie-shaped arm is connected to two outer pie-shaped arms.

\* \* \* \* \*